No. 874,585. PATENTED DEC. 24, 1907.
J. B. HALE.
STRAW RACK FOR GRAIN SEPARATORS.
APPLICATION FILED JULY 6, 1905.
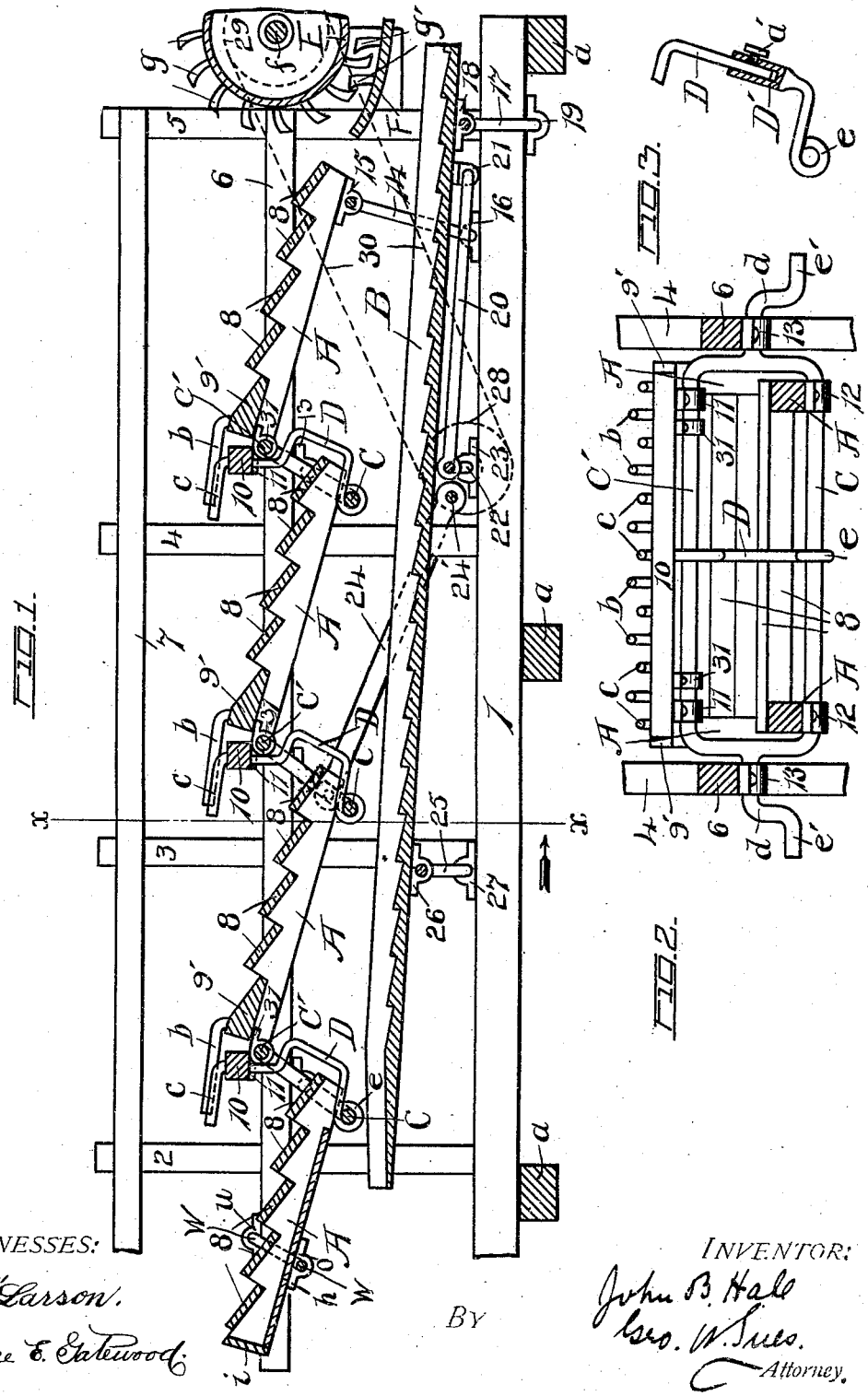
WITNESSES:
F. C. Larson.
Grace E. Gatewood.
INVENTOR:
John B. Hale
Geo. W. Sues.
BY
Attorney.
THE NORRIS PETERS CO., WASHINGTON, D. C.

UNITED STATES PATENT OFFICE.

JOHN B. HALE, OF OMAHA, NEBRASKA.

STRAW-RACK FOR GRAIN-SEPARATORS.

No. 874,585.
Specification of Letters Patent.
Patented Dec. 24, 1907.

Application filed July 6, 1905. Serial No. 268,581.

*To all whom it may concern:*

Be it known that I, JOHN B. HALE, a citizen of the United States, and resident of Omaha, in the county of Douglas and State of Nebraska, have invented a new and useful Improvement in Straw-Racks for Grain-Separators.

This invention relates to a new and improved straw rack for grain separators.

The aim of my invention is to provide a straw rack for a threshing machine adapted to be used in feeding the straw to the rear and out of a threshing machine, and agitating and keeping the straw in a loose state in feeding the same through a threshing machine to insure a thorough separation of the grain kernels, and unthreshed heads from the straw.

In the accompanying drawings, I have shown in Figure 1, a side view with portions broken away of a straw rack for grain separators embodying my invention. Fig. 2, shows an end view with portions removed, while, Fig. 3, shows a detached detail of one of the sliding arms as used in my invention.

In carrying out the aim of my invention, I secure to suitable transverse sills $a$, the end sills 1, 1, from which extend the uprights 2, 3, 4, and 5, secured above by means of the strengthening bars 7. In front of this supporting frame is held the usual cylinder E, and concave F, provided with the teeth $g$ and $g'$, respectively as is usual in machines of this character, the cylinder E, being carried upon the shaft $f$, and being provided at one end with a pulley 29, shown in dotted lines from which extends a suitable driving belt 30, also shown in dotted lines, passing over a pulley 28, indicated in dotted lines in Fig. 1, which pulley 28, is secured to the crank shaft 22, working within suitable bearings 23, as shown. The bearings 23, are secured to the end sills 1, as shown in Fig. 1. Secured to these end sills 1, at one end, are the lower bearings 19, adapted to receive the crank rock shaft 17, while secured to the bearings 27, near the opposite end and above is the crank rock shaft 25, these rock shafts supporting the lower grain pan B. This grain pan B, is provided with the usual riffled bottom, as shown, as is usual in this class of inventions. This grain pan B, is provided with the bearings 18, engaged by the crank rock shaft 17, while near the opposite end I provide the bearings 26, engaging the rock shaft 25, as shown.

At a suitable point preferably near the forward end I provide the ear 21, from which extends the pitman 20, secured to the crank shaft 22, so that as this crank shaft 22, is rotated, it imparts a rocking movement to the grain pan B.

Secured to the vertical standards 2, 3, 4, and 5, are the intermediate sills 6, which are provided at suitable points with the bearings 13, as shown in Fig. 2. Held within these bearings 13, as shown in Fig. 2, are the loop shafts C, each provided with an upper shaft member C', as shown in Fig. 1, and the lower shaft member C, from which extend the cranks $d$, which cranks are held within the bearings 13, each being provided with a crank end $e'$. In Fig. 1, I have shown my straw rack as provided with three such loop shafts. These loop shafts intermediately are provided with the supporting bars D, shown in Fig. 2, which are provided below with the loop $e$, working about the lower member C, while above these supporting bars D, are secured within the transverse rack bars 10, as clearly shown in Fig. 1.

In connection with my invention, I use a plurality of straw racks, each rack comprising two similar stepped side members A, each secured above by means of the slantingly held transverse top members 8, as is usual in a device of this class, and a terminal finger bar 9', and from these terminal finger bars 9', extend the fingers $b$. Each terminal finger bar 9', is provided with a bearing 31, as shown in Figs. 1 and 2, these bearings engaging the upper shaft members C', while at the opposite end, each side member A, is provided with a bearing 12, as is shown in Fig. 2, engaging the lower shaft member C, of the loop shaft in advance, so that each straw rack excepting the two terminal ones is secured at one end to the highest loop shaft member C', and at the opposite end to the lowest loop shaft member C', of the shaft in front, as clearly shown in Fig. 1. The first straw rack is supported by means of the rack bars 14, secured below to the bearings 16, and above, to the bearings 15, while the rear straw rack is secured by means of the hangers $w$, working within the bearing $o$, secured to the bottom $h$, the hanger $w$, above working within the bearing $u$, as shown.

Fixed to each upper loop shaft member C, by means of the bearings 11, shown in Fig. 2, are the rack bars 10, from which extend the fingers c, as is shown in Fig. 1, the fingers b and c traveling in different arcs so that they travel towards and away from one another to throw and shake up the straw above which passes over them from one rack to the other.

Extending from the crank shaft ends e', of the intermediate loop shaft, are the pitmen 24, secured to the ends of the pins 24', secured to the disks 28, fastened to the crank shaft 22, so that as the crank chaft 22, rotates, it operates the pitmen 24 and 20, to actuate the straw racks A, and the grain pan B. There are two such pitmen and disks 28; in the drawing however, but one set is shown.

If desired, the loop shafts may be made of several parts and secured adjustably so that the upper shaft member C', could be carried away or towards the lower shaft member C. In Fig. 3, I have shown such an arrangement in connection with one of the connected bars D, which is made to work within the socket D', provided with the set screw a'.

My device is simple of operation, and having thus described my said invention, what I claim as new and desire to secure by United States Letters Patent is:

In a device of the character described, the combination with a supporting frame, of a driving crank shaft, two suitably supported rock shafts, a grain pan held by said rock shaft, a pitman extending from said driving crank shaft and secured to said grain pan, a plurality of loop shafts supported by said frame, a finger bar secured to each upper loop member to each of said shafts, fingers extending from each of said finger bars, a suitably supported rock shaft, a straw rack secured at one end to said last mentioned rock shaft, and at the opposite end to the upper member of the first of said loop shafts, a set of two additional straw racks, each straw rack at its lower end being secured to the lower member of one of said loop shafts, and at the opposite end to the upper member of one of said loop shafts, an end straw rack secured at its forward end to the lower member of the last of said loop shafts, a rock shaft, said end straw rack being supported by said last mentioned rock shaft, a shield below said last mentioned rack, emptying upon aforesaid grain pan, a pitman extending from said driving crank shaft and secured to one of aforesaid loop shafts, and a plurality of fingers extending from the first three of aforesaid straw racks, all arranged substantially as and for the purpose set forth.

In testimony whereof I affix my signature in presence of two witnesses.

JOHN B. HALE.

Witnesses:
E. A. HOAG,
E. W. CULLEN.